No. 623,628. Patented Apr. 25, 1899.
E. B. W. REICHEL.
PROTECTING DEVICE FOR JOURNALS AND BEARINGS.
(Application filed Jan. 10, 1898.)
(No Model.)

Witnesses:
Inventor
Emil B. W. Reichel,
By Barton & Brown
Attorneys.

UNITED STATES PATENT OFFICE.

EMIL BERTHOLD WALTER REICHEL, OF BERLIN, GERMANY, ASSIGNOR TO THE SIEMENS & HALSKE ELECTRIC COMPANY OF AMERICA, OF CHICAGO, ILLINOIS.

PROTECTING DEVICE FOR JOURNALS AND BEARINGS.

SPECIFICATION forming part of Letters Patent No. 623,628, dated April 25, 1899.

Application filed January 10, 1898. Serial No. 666,137. (No model.)

*To all whom it may concern:*

Be it known that I, EMIL BERTHOLD WALTER REICHEL, a subject of the Emperor of Germany, residing at Berlin, Germany, have invented new and useful Improvements in Protecting Devices for Journals and Bearings, (Case No. 138,) of which the following is a specification.

My invention relates to improvements in a protecting device for journals, the object of my said invention being to provide means for effectively excluding dust and foreign substances from the bearings of a shaft and for preventing the leakage of oil or other lubricant therefrom. It is frequently found necessary to afford such protection from dust or to secure the retention of oil in the bearings of shafts which are more or less out of true, and in consequence the means ordinarily employed are not adequate for the purpose of obtaining these results on account of the eccentric movement of such shafts. It accordingly becomes requisite that a certain flexibility in the protecting device be provided to accommodate this slight eccentric movement of the shaft, while affording no hindrance to the rotation thereof. Moreover, it is found that an absolutely dust-tight protection is seldom secured for any great length of time, even under ordinary conditions. The device of my invention is designed to meet these requirements, while serving as well to protect a journal or bearing under normal conditions, and may be described in brief as consisting of a flexible shield or mantle or its equivalent encircling the shaft and stationarily mounted in the bearings or housing of said shaft to prevent the passage of dirt or oil, the free edge of said mantle or its equivalent being maintained in close engagement with the surface of the rotating shaft or equivalent part by means of a yielding or spring-like pressure preferably supplied by an annular coiled spring in engagement with said shield.

My said invention will be more readily understood by reference to the accompanying drawings, wherein—

Figure 1:
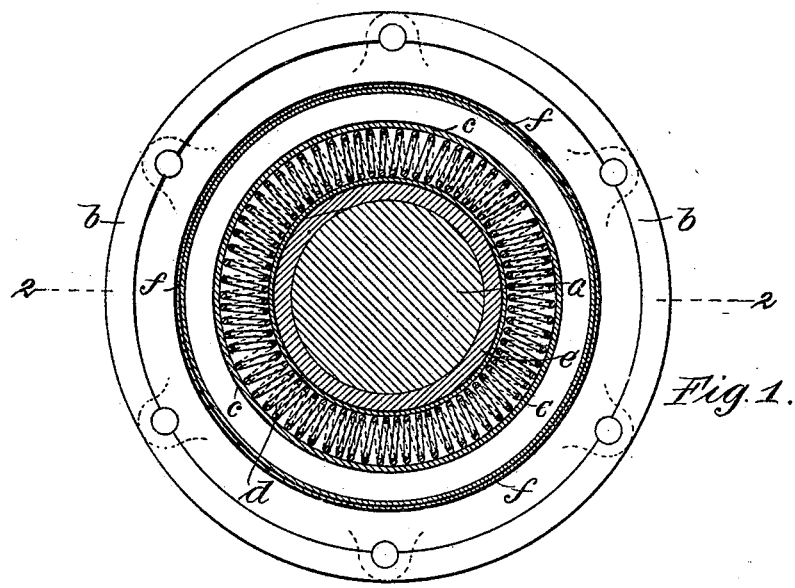
Figure 2:
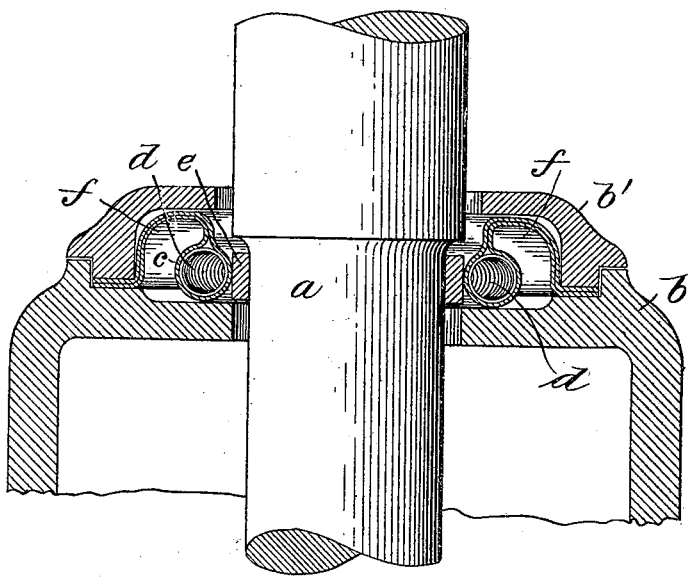

Figure 1 illustrates a housing or journal-box provided with a protecting device of my invention, which, with the shaft rotating in said journal-box, is shown in section. Fig. 2 is a vertical section thereof on line 2 2 of Fig. 1.

Like letters of reference indicate like parts in the two figures.

The shaft $a$ is mounted to rotate in the housing or journal-box $b$. Secured beneath the annular shell $b'$ is the protecting mantle or shield $c$, formed of suitable flexible material, such as leather or felt. This shield is annular in shape, the edges thereof being brought together and secured beneath the shell $b'$, while an annular coiled spring $d$, inclosed in the loop thus formed in the said shield, maintains the inner face of said shield in extremely close engagement with the leather collar $e$, mounted to bear upon the shaft. The shield or mantle is closely fitted about the spring, being sewed or riveted about it, and a fold $f$ is formed in said mantle or shield between the spring and the point of attachment beneath the shell $b'$ in order to secure the necessary accommodation to any eccentric movement or play of the shaft. The spring adapts itself to any unevenness of the shaft and maintains at all times a tight joint between the shield and the leather collar or equivalent part attached thereto and maintained in close engagement with the rotating shaft. It will thus be seen that the bearing is thoroughly shielded against the entrance of foreign matter, while the oil within said bearing will be securely retained therein.

Other applications of the protecting device than the one herein named will readily occur to a person skilled in the art. Obviously the shield could be mounted to rotate with the shaft while the spring engaged a seat or part upon the journal or housing; but this arrangement or reversal of parts I do not deem as advantageous as the one herein specifically described and shown. I do not desire to be understood as limiting my invention to the precise construction set forth.

I claim as new—

1. In a protecting device of the class described, the combination with a housing $b$, of a shaft $a$ mounted therein, a doubled annular mantle $c$ formed of flexible material, an annular spring $d$ disposed in the fold of the mantle and adapted to maintain a close joint between the inner engaging surface of the mantle and the shaft and means for securing the outer edges of the doubled mantle firmly in engagement with the housing, substantially as described.

2. In a protecting device for bearings, the combination with a housing $b$, of a doubled annular mantle $c$ of flexible material, means for securing the outer edges of the mantle in close engagement with the housing, said mantle being provided with a pocket or fold $f$ permitting of a slight lateral movement of the shaft and an annular spring $d$ disposed within said mantle and adapted to secure a close joint between the inner surface of said mantle and the shaft, substantially as described.

3. In a protective device for bearings, the combination with a housing $b$, of a doubled annular mantle $c$ of flexible material, means for securing the outer edges of the mantle in close engagement with the housing, said mantle being provided with a pocket or fold $f$ permitting of a slight lateral movement of the shaft, an annular spring $d$ disposed within said mantle and adapted to secure a close joint between the inner surface of said mantle and the shaft, and a leather ring $e$ forming the inner face of the annular mantle adapted to be forced by said spring into close engagement with the shaft, substantially as described.

In testimony whereof I affix my signature in the presence of two witnesses.

EMIL BERTHOLD WALTER REICHEL.

Witnesses:
CHARLES H. DAY,
HENRY HASPER.